United States Patent
Intagliata et al.

(10) Patent No.: US 10,443,771 B2
(45) Date of Patent: Oct. 15, 2019

(54) CRIMPING PROCESSES FOR HOSE ASSEMBLIES AND HOSE ASSEMBLIES PRODUCED THEREBY

(71) Applicant: ContiTech USA, Inc., Fairlawn, OH (US)

(72) Inventors: Joseph Vincent Intagliata, Hanna, IN (US); Jeffrey Robin Intagliata, Wanatah, IN (US)

(73) Assignee: ContiTech USA, Inc., Fairlawn, OH (US)

( * ) Notice: Subject to any disclaimer, the term of this patent is extended or adjusted under 35 U.S.C. 154(b) by 1033 days.

(21) Appl. No.: 14/863,578

(22) Filed: Sep. 24, 2015

(65) Prior Publication Data

US 2016/0084409 A1 Mar. 24, 2016

Related U.S. Application Data

(60) Provisional application No. 62/054,680, filed on Sep. 24, 2014.

(51) Int. Cl.
*F16L 33/207* (2006.01)
*B21D 39/04* (2006.01)

(52) U.S. Cl.
CPC ........ *F16L 33/2073* (2013.01); *B21D 39/048* (2013.01)

(58) Field of Classification Search
CPC . F16L 33/2073; F16L 33/2076; B21D 39/048
See application file for complete search history.

(56) References Cited

U.S. PATENT DOCUMENTS

| 1,825,005 A | 9/1931 | Lougheed |
| 2,002,839 A | 5/1935 | Stecher |
| 2,250,286 A | 7/1941 | White |

(Continued)

FOREIGN PATENT DOCUMENTS

| EP | 1975495 A1 * | 10/2008 | ............ F16L 11/082 |
| GB | 1467066 A | 3/1997 | |
| WO | WO-2006087745 A1 * | 8/2006 | ............. B62D 5/062 |

OTHER PUBLICATIONS

European Search Report dated Apr. 20, 2018, of European application EP 3198181 on which this application is based.

*Primary Examiner* — James M Hewitt, II
(74) *Attorney, Agent, or Firm* — David L. Cate

(57) ABSTRACT

Processes for securing a fitting to a hose end, and a hose assembly produced thereby. The fitting has an interior portion, exterior portion, and cavity therebetween. An end of the hose is located within the cavity and compressed between the interior and exterior portions. The exterior portion of the fitting has at least first and second circumferential crimped portions axially spaced apart along the fitting length, and first and second portions of the hose are compressed within the first and second circumferential crimped portions. The exterior portion of the fitting has an annular-shaped bubble portion between the first and second circumferential crimped portions. The bubble portion has a diameter larger than diameters of the first and second circumferential crimped portions, and the hose has a portion radially expanded into an annular-shaped cavity surrounded by the bubble portion as the hose is compressed at the first and second portions thereof.

5 Claims, 6 Drawing Sheets

(56) References Cited

U.S. PATENT DOCUMENTS

| | | |
|---|---|---|
| 3,224,794 A | 12/1965 | Crissy |
| 3,530,900 A | 9/1970 | Kish |
| 3,540,486 A | 11/1970 | Flounders |
| 3,549,180 A | 12/1970 | MacWilliam |
| 4,226,446 A | 10/1980 | Burrington |
| 4,522,435 A | 11/1985 | Miller et al. |
| 4,650,223 A | 3/1987 | Miyazaki |
| 4,690,435 A | 9/1987 | Manning et al. |
| 4,863,197 A | 9/1989 | Munoz |
| 5,044,671 A | 9/1991 | Chisnell et al. |
| 5,096,231 A | 3/1992 | Chisnell et al. |
| 5,207,460 A | 5/1993 | Oetiker |
| 5,370,425 A | 12/1994 | Dougherty et al. |
| 5,387,016 A | 2/1995 | Joseph et al. |
| 5,797,629 A | 8/1998 | Beagle |
| 6,619,699 B2 | 9/2003 | Brumfield |
| 6,866,302 B2 | 3/2005 | Furuta et al. |
| 7,249,787 B1 | 7/2007 | Chisnell |
| 7,387,317 B2 | 6/2008 | Chisnell |
| 7,530,604 B2 | 5/2009 | Kerin et al. |
| 8,042,270 B2 | 10/2011 | Otake et al. |
| 2005/0040646 A1 | 2/2005 | Brumfield et al. |
| 2005/0285392 A1 | 12/2005 | Brauckmiller et al. |
| 2008/0136176 A1* | 6/2008 | Katayama ............. F16L 13/142 285/256 |
| 2012/0007356 A1* | 1/2012 | Menor .................... F16L 33/01 285/257 |
| 2012/0216591 A1 | 8/2012 | Seghi et al. |
| 2013/0160284 A1 | 6/2013 | Gatz et al. |
| 2015/0097366 A1 | 4/2015 | Gledewell et al. |

\* cited by examiner

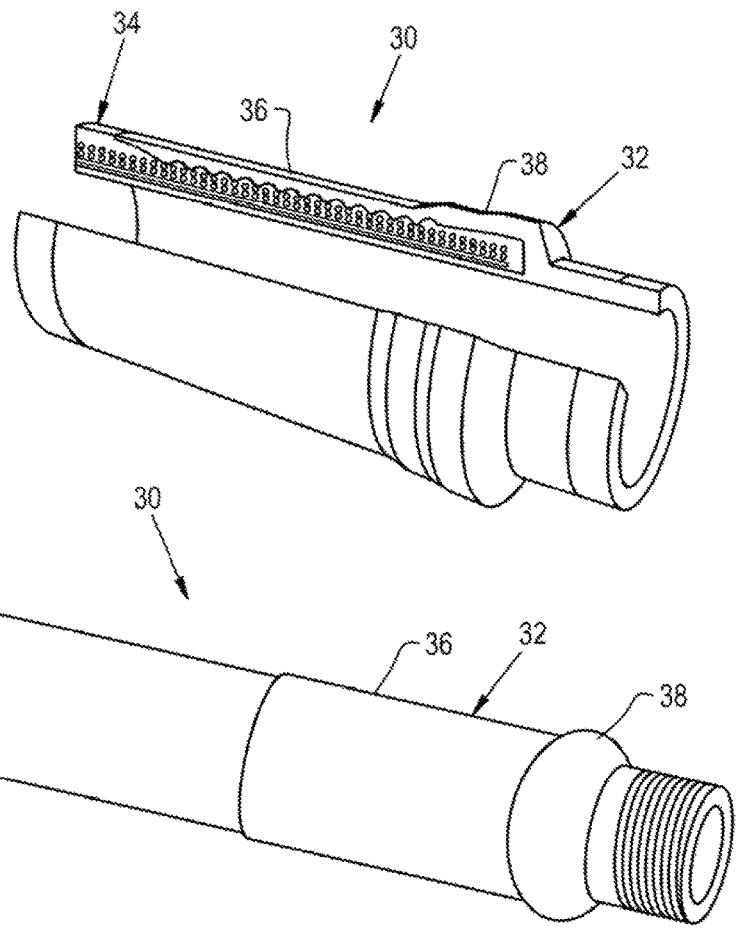
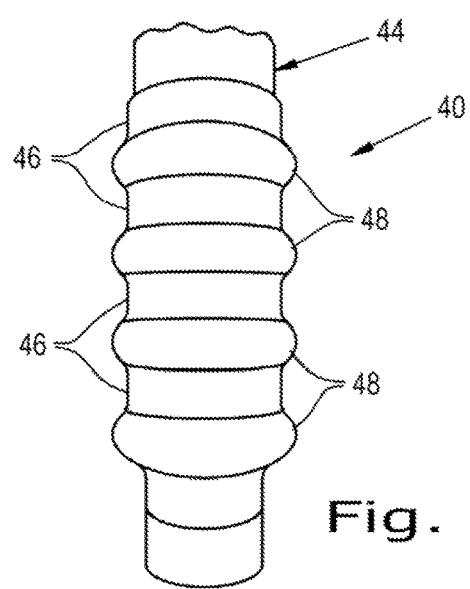
Fig. 3 (Prior Art)
Fig. 4 (Prior Art)
Fig. 5

CRIMPING PROCESSES FOR HOSE ASSEMBLIES AND HOSE ASSEMBLIES PRODUCED THEREBY

CROSS REFERENCE TO RELATED APPLICATIONS

This application claims the benefit of U.S. Provisional Application No. 62/054,680, filed Sep. 24, 2014, the contents of which are incorporated herein by reference.

BACKGROUND OF THE INVENTION

The present invention generally relates to hose assemblies and their manufacture. More particularly, this invention relates to processes for securing fittings to hoses to produce hose assemblies, nonlimiting examples of which include rotary hose assemblies, vibration hose assemblies, choke and kill hose assemblies, super choke and kill hose assemblies, and Kelly hose assemblies. As used herein, the terms "hose" and "hose assemblies" refer to any hose, tube or other type of conduit or conduit assembly adapted to transport a fluid (liquid or gas) or protect electrical wiring or other hardware susceptible to damage.

FIG. 1 shows an example of a hose fitting 10 attached to an end of a hose 12. The hose 12 has a relatively large diameter (e.g., exceeding two inches (about 5 cm)) and is part of a high-pressure hose assembly of a type commonly used, for example, by the oil industry. FIG. 11 represents a similar hose 16 as comprising an interior layer 20 (typically rubber or another elastic, flexible or pliable material), a surrounding reinforced intermediate layer 22 (e.g., reinforced with steel wire), and an exterior layer 24 (typically rubber or another elastic, flexible or pliable material) that surrounds the interior and intermediate layers 20 and 22. Processes for attaching hose fittings to hoses of the types represented in FIGS. 1 and 11 are currently performed with hydraulic swaging machines, an example of which is shown in FIG. 2. The industries that utilize rotary and vibration hose assemblies typically use a hydraulic swaging process as it is currently considered to be the most effective manner available. For relatively large-diameter, high-pressure hoses, current swaging machines are not powerful enough to compress a fitting onto the end 18 of the hose 16 with the exterior layer 24 present. Therefore, FIG. 12 represents the end 18 of the hose 16 as having been externally skived to remove the exterior layer 24 before attempting to attach a hose fitting using a swaging process. A common industry method for removing a rubber exterior layer 24 during the skiving process involves manually removal with a machete or similar tool. This process is very laborious and time consuming. For example, it is common for the skiving process to take fifteen minutes or more to remove a rubber exterior layer from each end of a hose, for a total accumulative time of thirty minutes or more of labor per hose.

Once the hose 16 has been prepared as shown in FIG. 12, swaging processes are generally accomplished by loosely assembling a fitting (not shown) onto the skived end 18 of the hose 16, placing the unfastened (unswaged) hose assembly in a swaging machine, and then operating the swaging machine to crush (compress) the fitting with die halves, such that an initial diameter of a portion of the fitting is reduced to a diameter nearly equal to the die halves. More particularly, the swage is created by pushing or forcing the fitting through the die halves that together define a tapered inner diameter. The fitting starts on the larger diameter side of the die halves and is pressed through the die halves toward the smaller diameter side using a large hydraulic cylinder as a ram. As the fitting passes through the die halves, it is compacted and its diameter is reduced to the size of the smaller diameter defined by the tapered die halves. The desired final diameter of the swaged portion of the fitting, in other words, a diameter by which the fitting adequately squeezes the hose 16 to provide a permanent connection, is typically not achieved in a single swage cycle. Instead, the process must typically be repeated two or three times on the same portion of the fitting to reach the desired final diameter, and requires the use of progressively smaller die halves.

FIGS. 3 and 4 represent a hose assembly 30 having a hose fitting 32 swaged to a skived end of a hose 34. As shown in FIG. 3, one end of the hose 34 is received through an opening into an annular-shaped cavity between annular-shaped exterior and interior portions of the fitting 32, and is compressed within the cavity by the exterior portion within the portion 36 of the fitting 32 that has been swaged. As depicted in FIGS. 3 and 4, the portion 36 of the fitting 32 that is swaged is typically a single contiguous surface area or continuous segment of the fitting 32, typically separated from the adjacent unswaged portion of the fitting 32 by a circumferential "bubble" 38 that has a larger diameter than the swaged portion 36. There are no current processes that separate the swaged portion of a fitting into multiple separate (noncontiguous, discontinuous) surface areas or segments.

Though well suited and accepted in the industry, there are a few disadvantages to the current industry swaging methods. A particularly notable disadvantage is the time required to complete a swaging operation, for example, about 45 to 70 minutes per side of a hose assembly of the type represented in FIG. 1. Because each hose assembly typically requires two fittings to be attached at each end, a total time of about 90 to about 140 minutes may be required to assemble a complete hose assembly. This time restraint can significantly limit the total number of completed products that can be produced per day on a swaging machine. As such, another disadvantage of current industry swaging methods is that the desired final diameter cannot typically be achieved in a single swage cycle, such that a swaging machine typically requires multiple sets of die halves to swage a fitting to increasingly smaller diameters until the desired final diameter is achieved. This requirement adds additional time to the swaging process, particularly since the die halves must be removed and replaced between each cycle. Die halves are generally very heavy and difficult to move for an individual employee. Furthermore, the need for an extensive number of die halves increases the cost of purchasing, owning, and operating a swaging machine.

Attempts have been made to produce hose assemblies similar to those represented in FIGS. 1, 3, and 4 with a crimp machine used to crimp, rather than swage, the hose fitting to the hose. Notably, the crimp process relies on different principles than the swage process. As used herein, a crimp is a diametrical radial crushing (compacting) of a hose fitting onto a distal end of a hose to form a permanent connection, as opposed to the aforementioned swaging operation in which the fitting is pushed or forced through a tapered inner diameter defined by die halves. While both processes compress a fitting onto a hose, the crimping process involves moving the crimp dies radially inward into the fitting, whereas the swaging process holds the die halves stationary and pushes the hose through their tapered inner diameter.

Attempts have been made to crimp non-skived hoses and fitting assemblies in a single complete crimp cycle. An example will be described in reference to FIGS. 14A, 14B, and 15, which schematically represent the hose 16 of FIG. 11 assembled with a fitting 14 to form a hose assembly. FIG. 14A represents the fitting 14 loosely assembled on the hose 16 prior to crimping, and FIGS. 14B and 15 represent the result of a crimp machine having compressed (crushed) the fitting 14 onto the hose 16, with the exterior layer 24 (non-skived) still attached to the hose 16. FIG. 15 further identifies a crimp area 15 over which the crimp has been performed, and shows the crimp area 15 as being a continuous portion of the length of the fitting 14. Depending on the diameter of the hose 16 and the type, structure, size, or material of the fitting, the length of the crimp area 15 can be relatively long, for example, about 10 to about 14 inches (about 25 to about 36 cm) long. Notably, FIGS. 14A and 14B represent that crimping processes often cause elongation of the fitting 14 in the lengthwise (axial) direction. While normally negligible in small crimp lengths, for example, about 1 to about 4 inches (about two to about 10 cm) long, this effect may become a problem for long crimp lengths, for example, over about 4 inches (about 10 cm) long. As represented for the particular example of FIGS. 14A and 14B, a 15-inch (about 38 cm) long steel fitting may increase in length during crimping anywhere from about one-half inch to about 2 inches (about 1 to about 5 cm) in the axial direction. As a result of the fitting deformation during the crimping process, the exterior layer 24 (FIG. 11) of the hose 16 is distorted and often damaged. The damaged exterior layer 24 will often exhibit reduced strength and integrity relative to its original condition on the hose 16. This damage may cause premature failure at the connection/interface between the hose 16 and fitting 14 during pressure testing or operation. In one such attempt, the fitting 14 started to slide off the end of the hose 16 before the required test pressure could be achieved during pressure testing.

BRIEF DESCRIPTION OF THE INVENTION

The present invention provides processes for securing fittings to ends of hoses, and to hose assemblies produced thereby.

According to one aspect of the invention, a hose assembly includes a hose and a fitting. The fitting has an interior portion, an exterior portion, and a cavity therebetween. An end of the hose is located within the cavity and compressed between the interior and exterior portions. The exterior portion of the fitting has at least first and second circumferential crimped portions axially spaced apart along a length of the fitting, and first and second portions of the hose are compressed within, respectively, the first and second circumferential crimped portions. The exterior portion of the fitting further has an annular-shaped bubble portion between the first and second circumferential crimped portions. The bubble portion has a diameter that is larger than diameters of the first and second circumferential crimped portions, and the hose has a portion radially expanded into an annular-shaped cavity surrounded by the bubble portion due to the hose being compressed at the first and second portions thereof.

According to another aspect of the invention, a process for securing a fitting to an end of a hose includes assembling a fitting onto the end of a hose, crimping a first circumferential crimped portion of the fitting from an initial diameter to a final crimping diameter thereof to thereby define a crimp, and then crimping a second circumferential crimped portion of the fitting that is axially spaced apart from the first circumferential crimped portion. The second circumferential crimped portion is crimped from an initial diameter to a final crimping diameter thereof to define another crimp. Optionally, at least a third crimping operation can be performed on another circumferential crimped portion of the fitting from an initial diameter to a final crimping diameter thereof, with the end resulting being that the fitting is secured to the hose by the crimps.

Other aspects of this invention will be further appreciated from the following detailed description.

BRIEF DESCRIPTION OF THE DRAWINGS

FIGS. 3 and 4 depict portions of two hose assemblies in which a fitting has been swaged onto the end of a hose, and the swaged portion defines a single contiguous surface area or continuous segment of the fitting.

FIG. 5 shows an example of a hose assembly comprising a hose fitting attached by a crimping operation to an end of a hose in accordance with a nonlimiting embodiment of the invention.

DETAILED DESCRIPTION OF THE INVENTION

Figure 1:
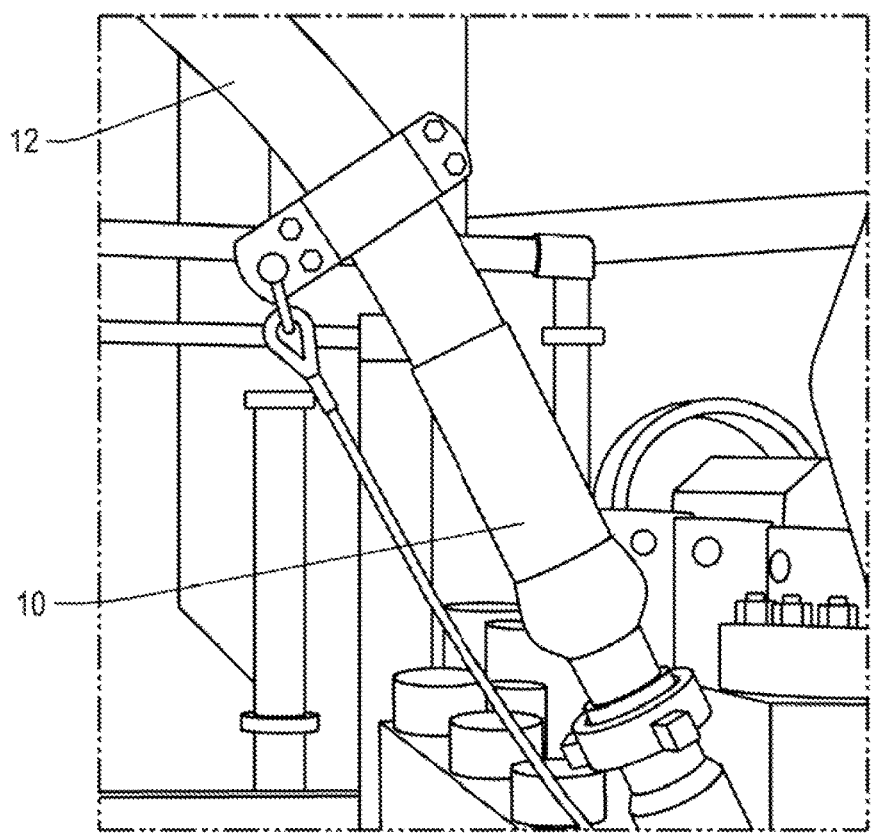
FIG. 1 shows an example of a hose assembly comprising a hose fitting attached to an end of a hose.

Preferred aspects of the present invention include the desire to simplify the process of attaching a fitting to a hose to produce a completed hose assembly, including relatively large-diameter, high-pressure hoses comparable to the types shown in FIGS. 1, 3, and 4. The process entails producing what will be referred to as a "bubble-style" crimp, a nonlimiting example of which is depicted in FIG. 5. As shown in FIG. 5, a bubble-style crimped hose assembly 40 includes a fitting 42 secured to a hose 44. The fitting 42 includes multiple crimped portions 46 and uncrimped "bubble" portions 48 therebetween. The hose assembly 40 is created using a crimping machine, for example, of a type represented in FIG. 6, instead of a swaging machine, for example, of the type represented in FIG. 2.

Figure 6:
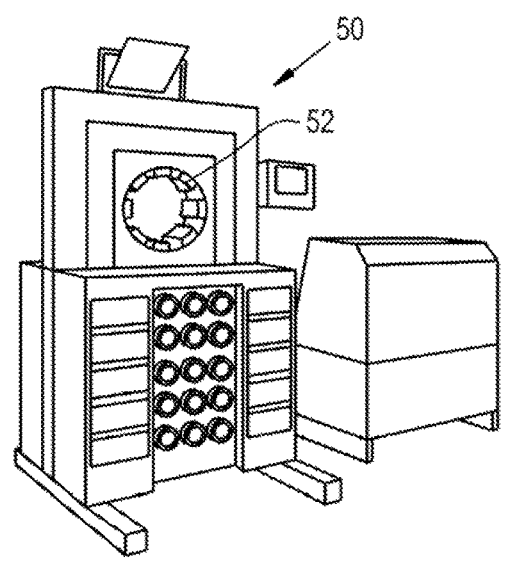
FIG. 6 shows an example of a crimping machine of a type capable of producing the hose assembly of FIG. 5.

The crimping machine 50 represented in FIG. 6 is capable of crushing (compressing) a limited circumferential portion of a fitting, from its initial "starting" diameter to a "final" diameter desired for the portion of the fitting, in a single crimp cycle, i.e., a cycle during which crimping dies (for example, dies 54 and 56 shown in FIGS. 7 and 8) are caused to collapse radially inward to engage and crimp the fitting, and then expand radially outward to release the fitting.

Figure 2:
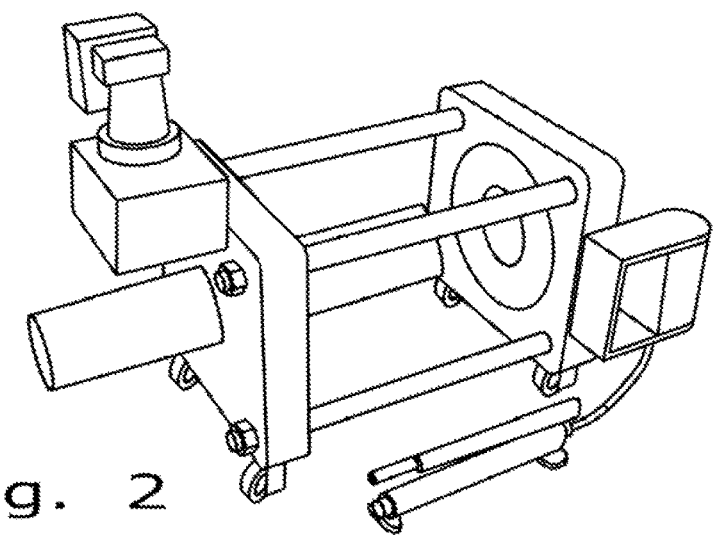
FIG. 2 shows an example of a hydraulic swaging machine of a type capable of producing the hose assembly of FIG. 1.

According to a preferred aspect of the invention, the hose assembly 40 is not produced by crushing the fitting 42 onto the hose 44 to produce one continuous deformed segment, as is the ordinary case with swaging machines of the type represented in FIG. 2. Instead, the hose assembly 40 is produced by operating a crimping machine to perform multiple crimp cycles on multiple different circumferential portions (separate locations) of the fitting 42 to yield the multiple circumferential crimped portions 46, with each crimping cycle crushing a different one of the circumferential portions from its starting diameter to its final diameter, preferably so that each crimped portion 46 is produced during a single cycle. As such, crimp cycles are performed as many times as needed to crimp different circumferential portions to yield the desired number of crimped portions 46 of the fitting 42, which are disposed and spaced along an axial extent of the fitting 42, as evident in FIGS. 5 and 10. For this purpose, after a crimp cycle is completed, the fitting 42 is axially moved to a new location in relation to the crimping dies, such that a different circumferential portion of the fitting 42 is disposed within the dies after which another crimp cycle is performed on that circumferential portion. By repeating this process, multiple circumferential portions of the fitting 42 are crimped with the result that the fitting 42 will have a bubble-type appearance, such as the nonlimiting example represented in FIG. 5. As such, it is preferred that the different circumferential portions are axially spaced apart relative to one another such that uncrimped circumferential portions of the fitting 42 remain between the crimped portions 46 to ultimately define the bubbles portions 48 of the fitting 42 after the crimping process has been completed.

Bubble-type crimps are conventionally used in automotive brake lines, air hoses, and the like on hoses having diameters of about 1 inch (about 2.5 cm) or smaller. These crimps are generally formed in a single crimp cycle and the die set is configured to simultaneously create as many bubbles as intended for the final configuration of the crimp. In contrast, the present invention forms bubble-type crimps using a multi-cycle crimping process in which each successive crimped portion 46 (and a bubble portion 48 between each adjacent pair of crimped portions 46) is formed in a separate crimp cycle. Furthermore, the crimping process can be performed on hoses having diameters of at least 2 inches (5 cm) and more preferably between two to five inches (5-13 cm) without damaging the hose, for example, by distorting and damaging an exterior layer of the hose.

Figure 13:
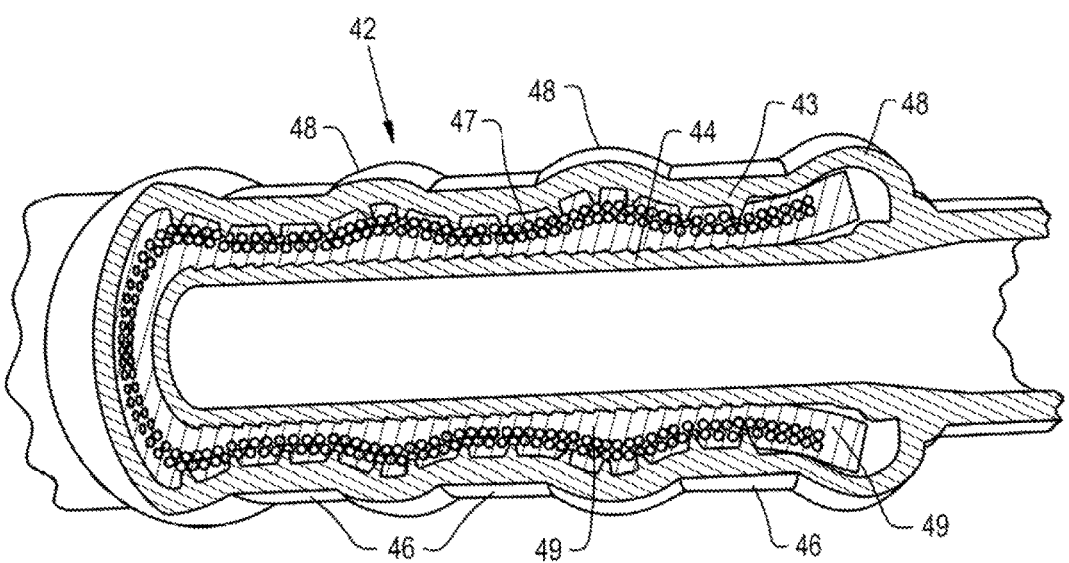
FIG. 13 represents a cross section of a hose assembly comprising a hose fitting attached by a crimping operation to an end of a hose in accordance with a nonlimiting embodiment of the invention.
Figure 14A:
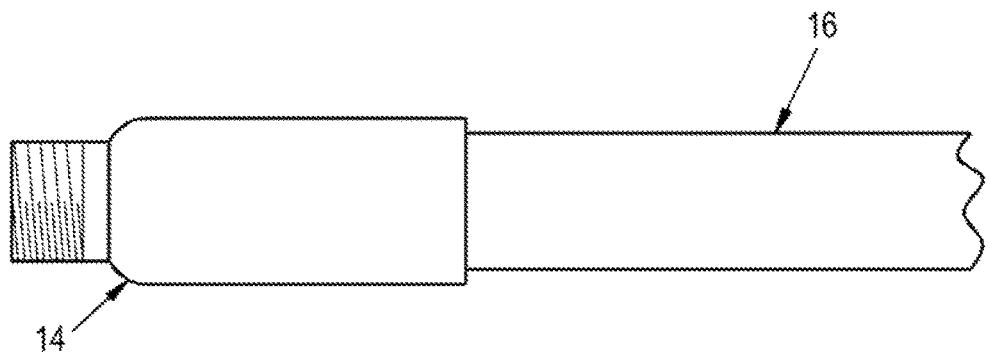
FIGS. 14A, 14B, and 15 depict portions of hose assemblies in which a fitting has been crimped onto the end of a hose, and the crimped portion defines a single contiguous surface area or continuous segment of the fitting.
Figure 14B:
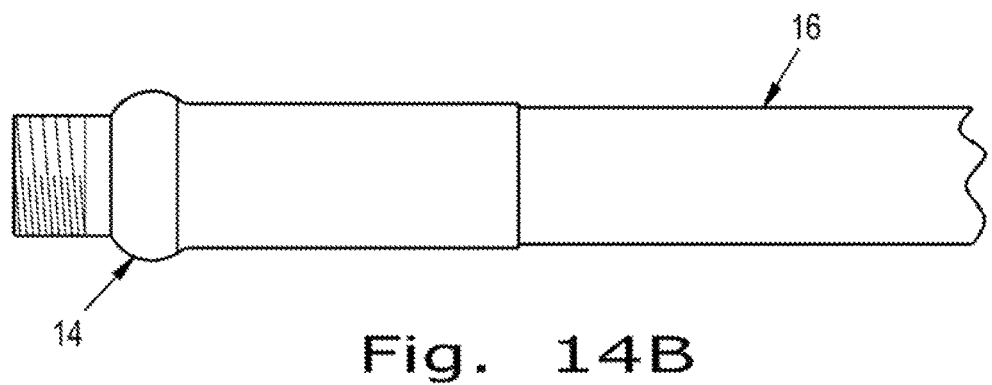
Figure 15:
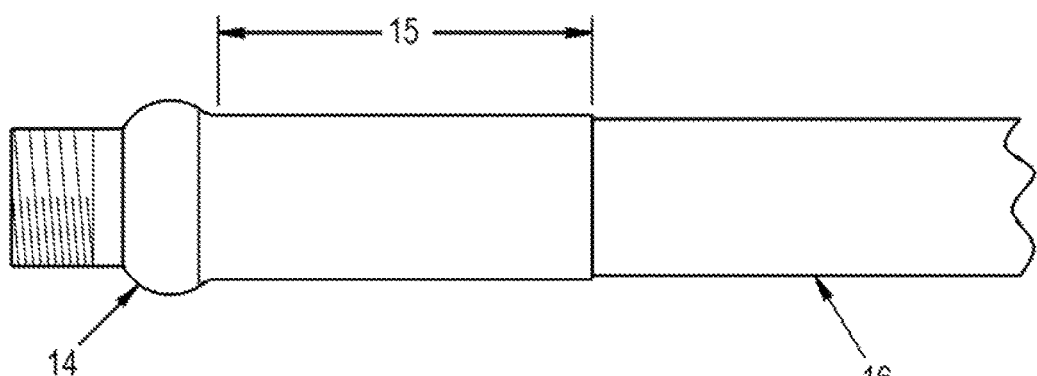

Preferably, the crimp dies have a crimp length of about 4 inches (about 10 cm) or less per crimp cycle, and more preferably have a crimp length of about 2 inches (5 cm) or less. According to a preferred aspect of the invention, a relatively short crimp length is capable of compressing a circumferential portion of the fitting 42 of limited axial length to the required final diameter of the crimped portion 46 without damaging the integrity of an exterior layer of rubber (or other elastic or flexible material) commonly present on the hose 44. The crimp cycle is repeated on different locations of the fitting 42 creating the bubble appearance. An annular-shaped interior cavity defined and surrounded by each bubble portion 48 provides an area for the exterior layer to deform into during the crimp cycle, allowing the exterior layer to expand without damaging the integrity and strength of the hose 44. FIG. 13 shows a cross section of a crimped fitting 42 in accordance with aspects of the invention. As represented, the hose 44 is received through an opening into an annular-shaped cavity between annular-shaped exterior and interior portions 43 and 44 of the fitting 42, and is compressed within the cavity by the exterior portion 43 at locations 47 surrounded by crimped portions 46 of the exterior portion 43. As a result of the crimping process, it can be seen that as the crimped portions 46 are formed in the exterior portion 43 of the fitting 42, the exterior layer of the hose 44 has radially expanded into interior annular-shaped cavities 49 within the bubble portions 48 of the crimp.

Figure 10:
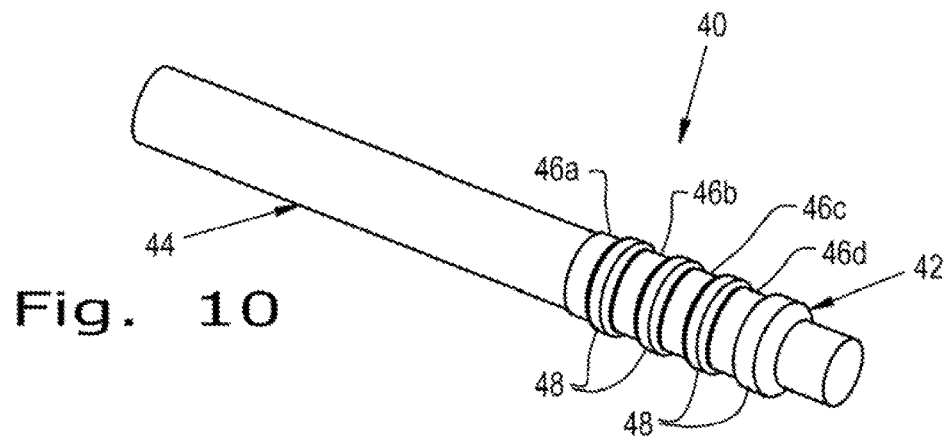
FIG. 10 represents an example of a hose assembly comprising a hose fitting attached by a crimping operation to an end of a hose in accordance with another nonlimiting embodiment of the invention.
Figure 11:
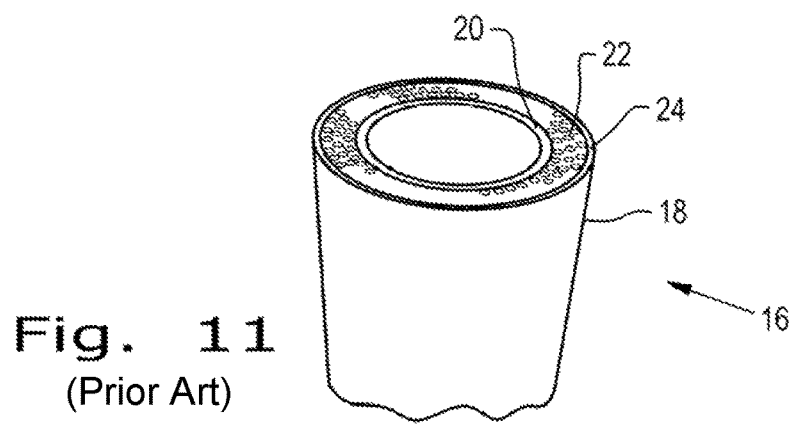
FIGS. 11 and 12 represent an example of a non-skived hose and a skived hose, respectively.
Figure 12:
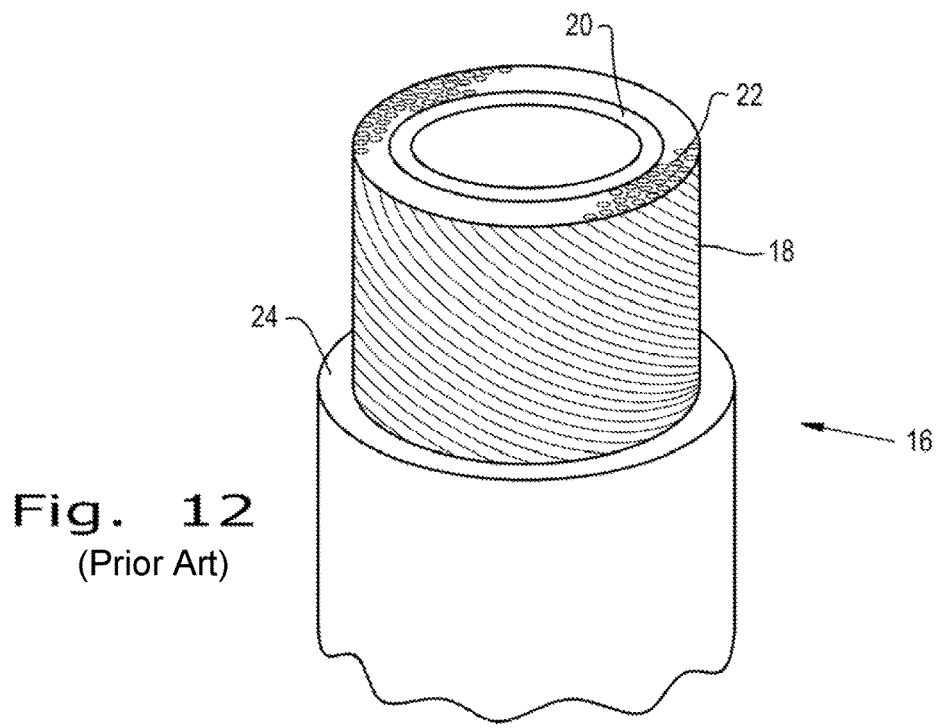

A multi-cycle crimping operation performed to produce a bubble-type crimp of the type represented in FIGS. 5, 10 and 13 is capable of providing considerable time savings in comparison to a fitting swaged onto a hose, such as was discussed in reference to FIGS. 1 and 2. As an example, in one investigation leading to the present invention the time required to crimp a fitting onto a hose and produce a crimped fitting of the type represented in FIG. 5 was roughly two to three minutes, and the time required to complete the entire hose assembly (fittings crimped onto both ends of the hose) was about seven to eight minutes. At this rate, the crimping process can be capable of producing approximately ten or more hose assemblies in the same amount of time required to produce a single hose assembly using a swaging machine and the previously described swaging method.

Another advantage is that the crimping dies do not have to be removed during the entire process of crimping a fitting to a hose. Crimping dies, for example, of the type shown in FIG. 7, can crush a portion of a fitting to its final diameter in a single crimp cycle. After the crimp cycle, the fitting is relocated within the crimping machine so that a different axial portion of the fitting is placed within the same set of dies, after which another crimp cycle can be performed that is essentially a repeat of the prior crimp cycle. As such, time is saved because the machine operator is not required to replace the dies, but instead merely repositions the fitting and hose within the dies prior to performing a subsequent crimp cycle.

In addition to saving time, the crimping process described above can be performed to create a reliable crimp without the requirement to skive the end of a hose. The crimp dies can be sized such that each crimp cycle has enough applied power to compress (crush) the fitting to the desired final diameter with the exterior layer of the hose still attached. Although the end of the hose may optionally be skived or non-skived, the ability to eliminate the skiving process offers the opportunity to further reduce the time to finish a hose assembly.

A variation that may exist is the number of crimp locations that are needed to secure a fitting to a hose. Though FIG. 5 show four circumferential crimp locations, anywhere from two to a much larger number of crimp locations can be formed. Generally, it is believed that the order in which the crimps are made does not matter. FIG. 10 indicates the fitting 42 was crimped in sequence starting at a location proximal to the hose 44 and ending at a location distal from the hose 44 in the order of crimped portions 46a, 46b, 46c, and then 46d. This order can be reversed or performed in any other order.

Figure 7:
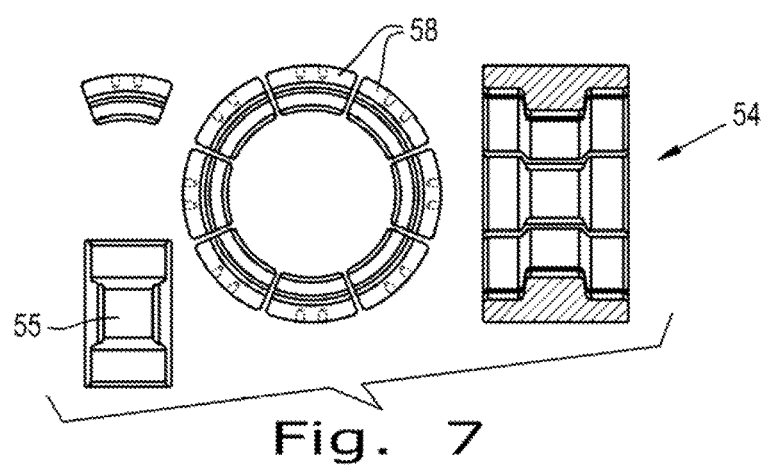
FIG. 7 represents a set of crimp dies capable of being used with the crimping machine of FIG. 6.
Figure 8:
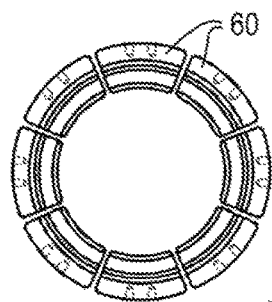
FIG. 8 represents another set of crimp dies capable of being used with the crimping machine of FIG. 6.
Figure 8:
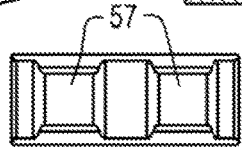

Another variation that may exist is the number of locations that can be simultaneously crimped with a die set. Whereas the die set 54 shown in FIG. 7 is configured to form a single crimp on a circumferential portion of a fitting with the crimp surface 55, FIG. 8 shows a die set 56 capable of simultaneously forming two crimps on two separate and axially spaced circumferential portions of a fitting with crimp surfaces 57.

Figure 9:
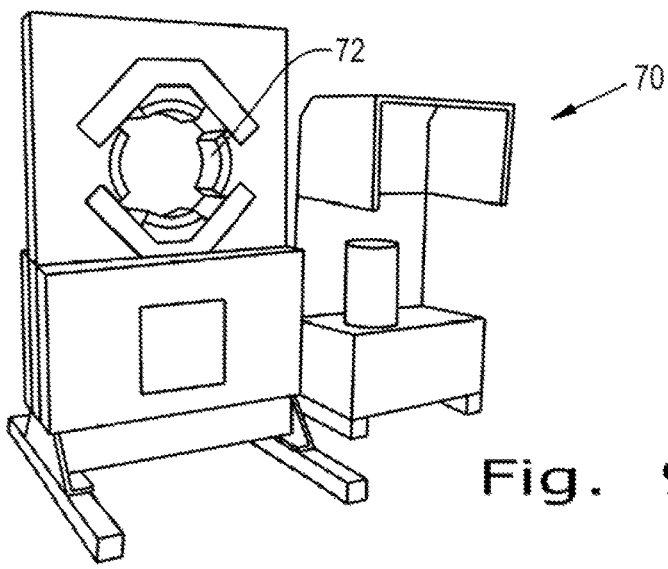
FIG. 9 shows another example of a crimping machine of a type capable of producing the hose assembly of FIG. 5.

Yet another variation that may exist is the number of die fingers within the die set being used. Whereas the crimping machine 50 in FIG. 6 and the die sets 54 and 56 shown in FIGS. 7 and 8 comprise eight fingers 52, 58, and 60, respectively, FIG. 9 shows a crimping machine 70 in which a die set comprises four fingers 72. Die sets comprising fewer and greater numbers of die fingers are also within the scope of the invention.

The aspects and features described above are believed to be applicable to essentially any hose size suitable for a rotary hose, vibration hose, choke and kill hose, super choke and kill hose, or Kelly hose. The aspects and features described above are also believed to be applicable to essentially any style and size of fitting that may be attached to such hoses. The aspects and features described above are believed to be particularly useful when crimping relatively large diameter hoses and fittings having crimp lengths in excess of about 4 inches (about 10 cm) long.

While the invention has been described in terms of specific embodiments, it is apparent that other forms could be adopted by one skilled in the art. For example, the physical configuration of the crimping machines, fittings, and hose assemblies could differ in appearance and construction from that shown, and materials and processes/methods other than those noted could be used. Therefore, the scope of the invention is to be limited only by the following claims

The invention claimed is:

1. A process of securing a fitting to an end of a hose, the fitting having an axial extent, the process comprising:
    crimping a first circumferential portion of the fitting from an initial diameter to a final crimping diameter to thereby define a first crimp; and,
    in a next cycle, crimping a second circumferential portion of the fitting axially spaced apart from the first circumferential portion, the second circumferential portion being crimped from an initial diameter to a final crimping diameter to thereby define a second crimp; and,
    performing at least a third crimping operation cycle on a third circumferential portion of the fitting from an initial diameter to a final crimping diameter, wherein the third circumferential portion is axially spaced apart from the first and second circumferential portions;
wherein the third circumferential portion is located at an axial location such that once the third circumferential portion is crimped an uncrimped circumferential portion of the fitting remains between the second crimp and the third crimp, the uncrimped circumferential portion defining a bubble portion of the fitting after crimping the second circumferential portion; and,
whereby the fitting is secured to the hose by the crimps.

2. The process of claim 1, further comprising locating the second circumferential portion at an axial location such that once the second circumferential portion is crimped an uncrimped circumferential portion of the fitting remains between the first crimp and the second crimp, the uncrimped circumferential portion defining a bubble portion of the fitting after crimping the second circumferential portion.

3. The process of claim 2, wherein the hose has a portion radially expanded into an annular-shaped cavity surrounded by the bubble portion due to first and second portions of the hose being compressed at the first and second circumferential portions of the fitting.

4. The process of claim 1, wherein the hose is not skived prior to crimping the first circumferential portion.

5. The hose assembly produced by the process of claim 1.

* * * * *